United States Patent Office 2,890,993
Patented June 16, 1959

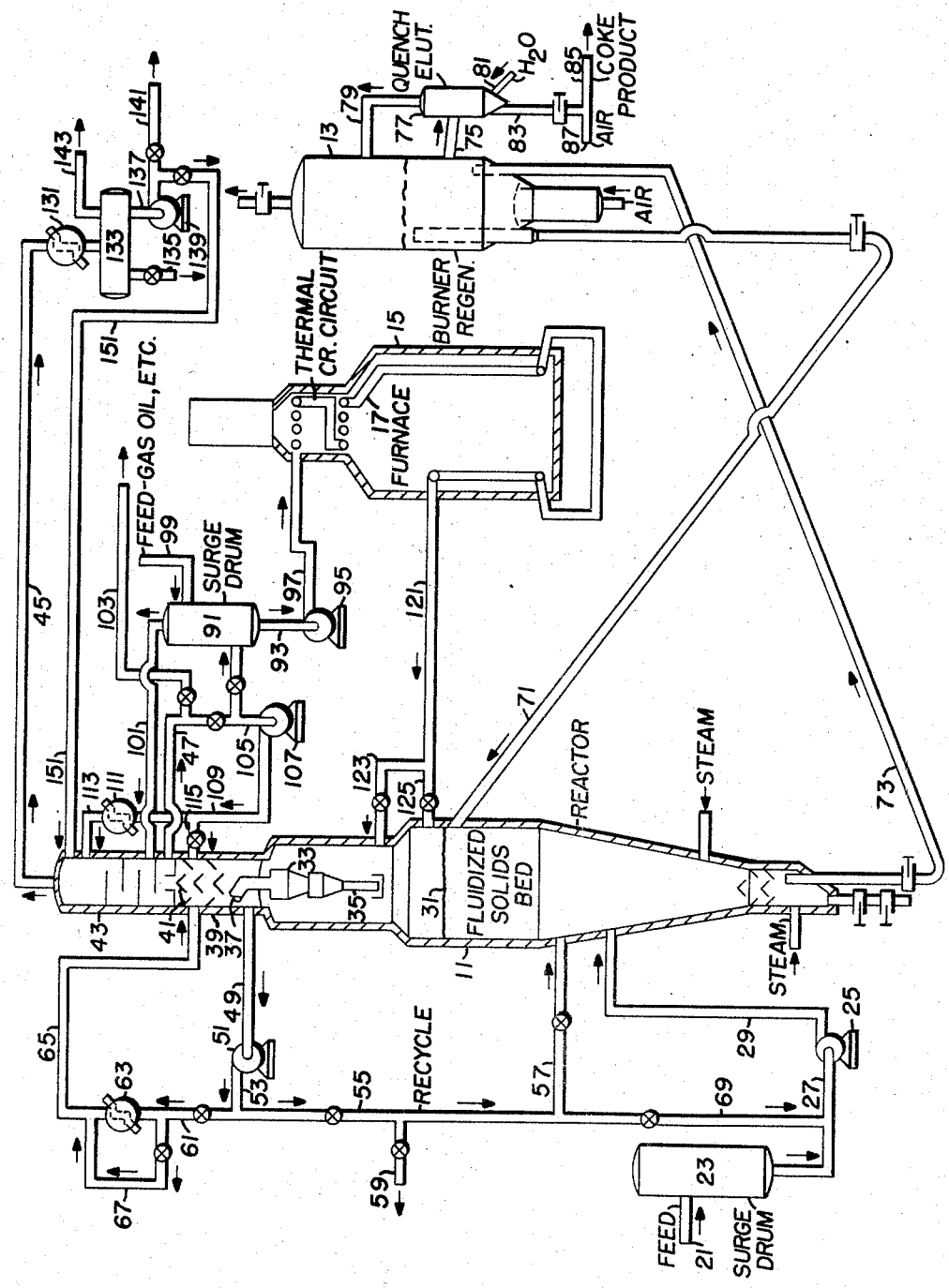
Carl E. Kleiber  Inventor

2,890,993

COMBINATION FLUID SOLIDS REACTOR AND THERMAL CRACKING UNIT

Carl E. Kleiber, Chester Township, Morris County, N.J., assignor to Esso Research and Engineering Company, a corporation of Delaware Application April 25, 1956, Serial No. 580,597

9 Claims. (Cl. 208—48)

The present invention relates to a combination fluid solids reactor and thermal cracking unit and particularly to an integrated combination designed to obtain high quality products with a minimum of deposition of coke and other objectionable deposits.

In the prior art, processes and apparatus have been developed for carrying out reactions such as conversion of hydrocarbons to lighter products by contacting the feed materials with masses of mobile or "fluidized" solid particles heated to suitably high temperatures. A specific example of such a system is a fluidized solids coking system for conversion of heavy residual hydrocarbon oil. Such a system is described in the Pfeiffer et al. application, Serial No. 375,088, filed August 19, 1953. While the present invention is particularly suitable for use in combination with such a coking system, it is not necessarily limited thereto. It may be used in combination with systems using other types of fluidized solids such as cracking catalyst, etc.

In the fluidized solids coking system, such as described in the Pfeiffer et al. application mentioned above, several difficulties have been encountered. Various solutions have been proposed but have not always been entirely satisfactory. For example, the quality of the gas oil produced in a fluid solids coker, using heavy residual stocks as feed, is not always acceptable as catalytic cracking feed. The gas oil frequently contains heavy ends, high proportions of contaminants which interfere with subsequent cracking operations of sensitive catalyst materials and the like. Moreover, in the overhead outlet system from such cokers, there is a strong tendency to form deposits of carbonaceous residues on the walls and outlet lines of the apparatus. These deposits are extremely objectionable, frequently requiring shutting down of the apparatus for cleaning out and unplugging of clogged lines and removal of accumulated deposits on vessel and internal equipment surfaces, which interfere with the functioning and feed capacity of the system. Various attempts have been made in the past to remedy these problems with varying degrees of success.

According to the present invention, a fluid solids processing system, such as a fluid coker, is integrated with a thermal cracking circuit. The feed to the thermal circuit may be, and preferably is, the gas oil produced in the fluid coker or a part thereof and any unconverted fraction thereof suitable for additional recycle. This feed, if desired, may be supplemented by adding any suitable extraneous feed stock. The gas oil, with or without supplemental feed stock, is passed through the thermal cracking circuit. The later is operated at sufficiently high temperature to accomplish a substantial degree of thermal cracking but the temperature is not high enough to cause substantial conversion to coke or other solid residues. The resulting cracked products from the thermal cracking circuit are introduced into the open or disperse phase zone above the fluidized solids bed in the reactor. Steam may be introduced along with the thermally cracked vapors, if desired. By this system, substantial heat is added to the disperse phase of the reactor and the vapor pressure of the products normally emerging from the fluidized solids bed is substantially reduced as is the possibility of product condensation on vessel or internal equipment surfaces. The net result is that the products from the solids bed, for example, the conversion products of a coking operation, are carried overhead at higher temperature. Reactions which tend to proceed therein and to cause formation of objectionable carbonaceous deposits are substantially inhibited. Also, by preventing condensation and the consequent deposition of liquid on vessel surfaces formation of these deposits is effectively prevented. The degradation which results in the formation of such deposits consequently does not proceed and the apparatus, including the cyclones, outlet lines, etc., is kept substantially free from carbonaceous deposits. Also, by the introduction of additional heat into the outgoing vapors, fractionation thereof is facilitated and better separation is obtained between naphtha and gas oil, between gas oil and heavy bottoms, etc. The resulting products are therefore of better quality. The objectionable residues and deposits are minimized in the lighter products, i.e. coker naphtha and coker gas oils up to about 1000–1100° F. end point equivalent to an 80% distillation point in the range of 850–950° F. for the 400° F. plus gas oil. The undesirable heavy fractions are thus concentrated in a bottom fraction which is either withdrawn as such or recycled to the fluid coker system for disposal.

The combination of the thermal cracking circuit to which, for example, the coker gas oil is subjected for treatment with a fluid solids coker is only one adaptation of the present invention. Another desirable application of this invention is the integration of a thermal cracking circuit, described more fully below, with a conventional fluid catalytic cracking unit. With this type of combination or integration of equipment and process, the products of the thermal cracking circuit are discharged into the dilute phase of the catalytic cracking reactor. This tends not only to reduce coke deposits in the apparatus, which are often encountered, but it will also promote beneficial thermal after-cracking of the vapors emerging from the catalytic cracking bed.

The feed to the thermal cracking circuit may be either the coker gas oil mentioned above, or a combination thereof with other materials such as a cycle gas oil from the catalytic cracker. Alternatively, a catalytic naphtha or even extraneous feeds such as virgin naphtha, light or heavy, may be added. In such a system, there is substantial flexibility in the catalytic cracking operation or in the thermal cracking operation. The ratio of the various feed stocks obviously may be varied considerably in accordance with requirements of the particular refinery and the particular types of feed available thereto.

In the thermal cracking circuit, the gas oil and/or other products to be cracked thermally are passed through suitably heated lines or coils at a temperature which may range from about 950° to 1200° F. or more, at the outlet. Higher temperatures result in greater production of unsaturates and also produce more coke. Hence the maximum permissible temperature depends on the desired type and yields of the various products. In general, temperatures are kept below 1200° F., unless it is desired to produce large quantities of unsaturates and considerable gas and coke. The pressure in this thermal cracking circuit may vary considerably, for example, from 20 to 300 p.s.i.g. Obviously, the thermal cracking circuit may comprise conventional coils, coil and drum arrangements, etc. The simple coil circuit is preferred in the present instance. It can be either fired independently in a suitable furnace or fire box or it may comprise a coil immersed in the solids bed of a fluid coker burner, or catalytic unit regenerator. Multiple thermal cracking circuits may be desirable in some cases to permit possible decoking of one circuit while the other is continued in operation.

Hence it will now be understood that major objects of the present invention are: (1) to reduce the tendency for coking, i.e. formation of coke deposits, in the overhead and outlet lines of a fluid solids system by releasing thermally cracked products thereto; (2) obtaining economic and processing advantages by combining thermal cracking with other operations, such as coking and/or catalytic cracking, in a fluid bed; and (3) improving the fractionation of the products from a fluid solids system by adding heat thereto in the form of hot vapors of thermally cracked products obtained from a separate thermal circuit.

The foregoing and other advantages will be more clearly apparent as a detailed description of a preferred embodiment of the present invention proceeds. Hence, reference will next be made to the accompanying drawing which illustrates diagrammatically and in elevation a combination integrated fluid solids and thermal cracking circuit system.

Referring now to the drawing, it will be noted that the major units are a fluidized solids reactor unit 11, a burner or regenerator unit 13 and a furnace 15 containing a thermal cracking circuit or coil system 17.

A suitable feed stock, such as a heavy residual petroleum stock, is fed to the system through an inlet line 21 and surge drum 23. From the latter, the feed passes downwardly to a pump 25 through line 27. From the pump 25 the fresh heavy feed passes through line 29 into a fluidized bed of solids, such as finely divided petroleum coke, suitably preheated before coming to the reactor 11. For a fuels coking operation, the temperature of the coke particles in the reactor is preferably between about 900° and 1150° F. The feed is distributed suitably through the reactor fluidized coke mass by means of nozzles not shown but well known in the art. As fast as the feed is converted, the vapors therefrom pass through the interface between the bed and the disperse zone above it as indicated at 31. From here, the vapors pass into a gas-solids separating unit such as cyclone 33 from which the solids are returned preferentially through a dip leg 35, the vapors passing overhead through line 37 into a scrubber unit 39 equipped with suitable baffles 41. The scrubber may or may not be superimposed on the reactor vessel. The scrubbed vapors proceed upwardly past a series of baffles into a fractionating tower 43 preferably directly above the scrubber but may be elsewhere in any suitable position. Here the vapors are fractionated into coker naphtha and gases which pass overhead through line 45. A liquid fraction, for example, a gas oil is taken off through line 47 and heavy bottoms are removed through line 49 and pump 51. The latter may be recycled in part to the coking bed through lines 53, 55 and 57, equipped with suitable valves. A portion may be withdrawn as a product through line 59. Preferably, at least a part of the heavy bottoms is recycled through line 61 and heat exchanger 63 to line 65 and back into the scrubber. This material helps to remove entrained heavy ends and solid particles in the scrubber system. If desired, the heat exchanger 63 may be by-passed through a line 67.

A part of the heavy recycle stream may be carried through line 69 into feed line 27 and introduced into the coker with the original or fresh feed for additional processing.

Hot fluidized solids are supplied to or near the top of the reactor fluidized bed by a line 71 which brings them from a burner or regenerator 13. Spent solids from the reactor may be returned through fluid solids transfer line 73 to the burner or regenerator. A portion of the returned solids may be taken from the burner through line 75 to a quench elutriator system 77. Here the coke is sprayed with water, or water plus steam, to cool it and to return the elutriated finer particles back into the burner or regenerator through line 79. The water is supplied through line 81 and the coarser solid particles separated in the quench elutriator may be withdrawn from the system through line 83 to outlet line 85. An air stream may be introduced at line 87 to help remove the coke product.

The apparatus described so far is substantially the commercial coking system described in the Pfeiffer et al. application mentioned above and in certain improvement applications and patents which need not be mentioned in detail.

The gas oil stream taken off near the bottom of the fractionation section 43 through line 47 is preferably taken to a surge drum 91, or other equivalent surge facilities. The surge unit is not always necessary but is usually desirable. From here, it is supplied through line 93 to a pump 95 which forces it at suitable pressure, through a line 97 into the thermal cracking circuit 17 operating at about 20–300 p.s.i.g. outlet conditions. Extraneous feed stock, such as gas oil, cycle oil from a catalytic cracker or cracked or virgin naphtha or mixtures thereof may be added to the surge drum through line 99. Vapors from the surge drum may be returned to the fractionator through line 101. Other side streams may be withdrawn from the fractionator system, if desired. Separate facilities for such withdrawal may be provided through a tower connection suitably located. However, a part of the stream from either of these tower withdrawal connections is preferably recycled through line 105 and pump 107 to line 109, heat exchanger 111 and inlet line 113 to a higher point in the fractionator for heat control and reflux duty. A portion of this recycle material may be fed to the scrubbing section through line 115. Also a portion of the overhead condensed coker naphtha product may be returned to near the tower top for supplementary tower top control duty by means of pump 139 and line 151.

Returning now to the gas oil fraction withdrawn through line 47 to the surge drum 91, etc., this fraction is passed through the thermal cracking circuit at such a rate as to accomplish the desired thermal conversion. As noted above, the outlet temperature from the thermal cracking coil 17 in furnace 15 should be at least 950° F. and it may be as high as 1200° F. or more. This temperature and the conditions of equipment design and operation should be such, however, as to avoid an objectionable amount of coking in the coil 17.

The thermally cracked gas oil emerges from the furnace through line 121 and passes through one or more lines 123, 125 into the disperse phase at the top of the reactor. The thermally cracked vapors thus introduced into the disperse phase pass upwardly through the cyclone 33 and through its outlet 37 into the scrubber section 39 and the fractionator 43 above it.

Because of their superheating and partial pressure effects, the vapor products of the thermal cracking circuit reduce the tendency toward coking and otherwise forming objectionable deposits in the dilute phase of the reactor. Moreover, the thermally cracked vapors themselves are of improved quality as gasoline blending stocks, giving definite processing and economic advantages. These advantages may be enhanced by introducing catalytic cracking cycle stock and/or virgin light naphtha through line 99 into the feed or surge drum 91 which supplies the thermal cracking circuit. Moreover, as pointed out above, the added heat supplied to the products emerging from the fluidized solids bed substantially improves fractionation of the overhead products and avoids the inclusion in the final gas oil stream taken from line 47 or 103, of objectionable contaminants such as metal compounds, heavy ends, etc. which contaminate cracking catalysts with which they may subsequently be contacted.

The gasiform products taken overhead from the fractionator through line 45 are passed through a heat exchanger and/or condenser 131 and thence into a distillate drum 133. From this drum which receives the condensed and cooled products at about 100° F. and at low pressure, preferably within 5 lbs. or so of atmospheric, the condensed steam and other water from the process operations may be withdrawn through outlet line 135. Liquid hydrocarbons in the form of coker naphtha, plus thermal naphtha, are withdrawn through line 137 to pump 139 from which they may be passed to suitable storage or further treating facilities through line 141, or returned through line 151 for fractionator tower top control duty. By control of suitable valves, the stream may be divided as desired.

The normally gaseous products, such as hydrogen and $C_3$ and lighter hydrocarbons, are admixed with some heavier fractions under equilibrium conditions. The mixture is taken overhead from the drum through line 143 for further processing and recovery of desirable fractions as deemed economical.

It will be understood that instead of using the reactor 11 of a fluid coker, a conventional fluid bed catalytic cracking reactor may be employed as the primary base of operations. The operations otherwise may be substantially the same as those described above. In a catalytic cracker of conventional type, the fractionator is not located at the top of the reactor and the products thereof are fractionated. Suitable fractions are obtained, such as the light and heavy naphthas and catalytically cracked gas oil is segregated and withdrawn through conventional facilities. The cycle oil or fraction thereof which is of very refractory nature, may be passed through the subject thermal cracking circuit for conversion. Also, other suitable extraneous feeds as coker naphtha, coker gas oil, virgin light or heavy naphthas, etc. may be fed and processed through this thermal cracking circuit. At least a substantial part of the resulting cracked products are discharged to the disperse phase of the fluid catalytic cracking reactor and taken off through the overhead system in the same manner and with the same advantages as previously described. Thus, heavy naphtha, either from virgin distilling operations or from other sources, may be given a thermal treatment to improve its octane number before passing it into the overhead or disperse phase in the primary reactor. This applies to either the coker reactor or the catalytic cracking reactor. Coker gas oil may be passed through the thermal coil, back to the coker, then with the naphtha to a catalytic cracking unit.

Surge drum 91, or its equivalent, can be inside the fractionator tower if desired. Line 151 may be used for starting up purposes. Various other modifications will be obvious.

It will be understood that numerous modifications, not mentioned, may be made in the system without departing from the spirit of the invention. It is intended to cover such so far as the state of the prior art permits and the following claims are intended to be so interpreted.

What is claimed is:

1. The process of converting heavy hydrocarbon oils, which have a tendency to form objectionable carbonaceous deposits, into lighter products, which comprises feeding said oil into contact with a fluidized bed of hot, finely divided solid particles to convert said oil at least in part to gas oil vapors, taking the gas oil vapors so produced through a disperse phase above said bed and through an outlet to a recovery zone wherein gas oil is recovered, passing at least a part of said gas oil from said recovery zone through an external thermal cracking zone to convert it to other products, and passing at least a substantial part of said other products back into said disperse phase to add heat thereto and to substantially prevent said formation of objectionable deposits.

2. Process according to claim 1 wherein the fluidized bed of hot solid particles is a mass of catalytically inert coking particles.

3. Process according to claim 1 wherein the finely divided solid particles are cracking catalyst particles.

4. The integrated process of coking heavy residual oils in a fluidized coking bed and thermally cracking lighter products including a part of the gas oil produced in the coking operation which comprises feeding at least a part of the coker gas oil products, together with extraneous feed of lower boiling range than the original coker feed, through a thermal cracking circuit to substantially crack said materials, passing at least a substantial part of the cracked materials from the thermal circuit into a disperse phase above the coking bed to superheat and also reduce vapor pressure of the coking bed vapor products in said disperse phase thereby to substantially reduce deposit-forming tendencies of said coker vapor products, and passing the thermally cracked products and the coker vapor products together to a fractionation zone whereby the heat content of the thermally cracked products asists in effective fractionation of the coker vapor products.

5. In the process of converting hydrocarbons at high temperature in a fluidized bed of solids, the improvement which includes passing a hydrocarbon stream at least a portion of which originates from the conversion products arising from said solids bed through a thermal heating coil at a temperature higher than said first mentioned temperature and introducing the thus thermally treated stream into a disperse phase above the solids bed so as to superheat conversion products arising from said bed and thereby inhibit coke deposits and promote further recovery of said conversion products.

6. A process according to claim 5 wherein the solids bed is a coking bed.

7. Process according to claim 5 wherein the solids bed is a catalytic cracking bed.

8. In a process for converting hydrocarbon oil into a more valuable product by treating said oil in a bed of hot fluidized solids from which vapor products pass upwardly through a relatively disperse phase above the bed and are taken overhead to a recovery state, and wherein said vapor products tend to degrade and form objectionable carbonaceous deposits en route to said recovery stage, the improvement which includes passing a stream of hydrocarbons at least a portion of which originates from said vapor products through a separate thermal circuit, heating said stream in said circuit for a time and at a temperature sufficient to accomplish substantial thermal conversion and temperature elevation thereof, and passing the effluent stream from said thermal circuit into said disperse phase to raise the temperature of said vapor products and assist in recovery thereof.

9. An integrated system for effecting improved hydrocarbon conversion, which comprises, in combination, a reaction vessel adapted to contain a fluidized solids bed in the lower portion thereof, cyclonic separating means positioned in the upper portion of said reaction vessel; fractionation means adapted to receive the vaporous effluent from said reaction vessel and to separate a distillate fraction therefrom; a thermal cracking unit; passage means for passing said distillate fraction from said fractionation means to said thermal cracking unit for thermal cracking therein; conduit means for passing hot cracked products from said thermal cracking unit to the upper portion of said reaction vessel, said conduit means discharging hot cracked products below the inlets to said cyclonic separating means.

References Cited in the file of this patent
UNITED STATES PATENTS

| | | |
|---|---|---|
| 2,470,263 | Peery | May 17, 1949 |
| 2,706,704 | Squires | Apr. 19, 1955 |
| 2,763,601 | Martin | Sept. 18, 1956 |